Patented Aug. 21, 1951

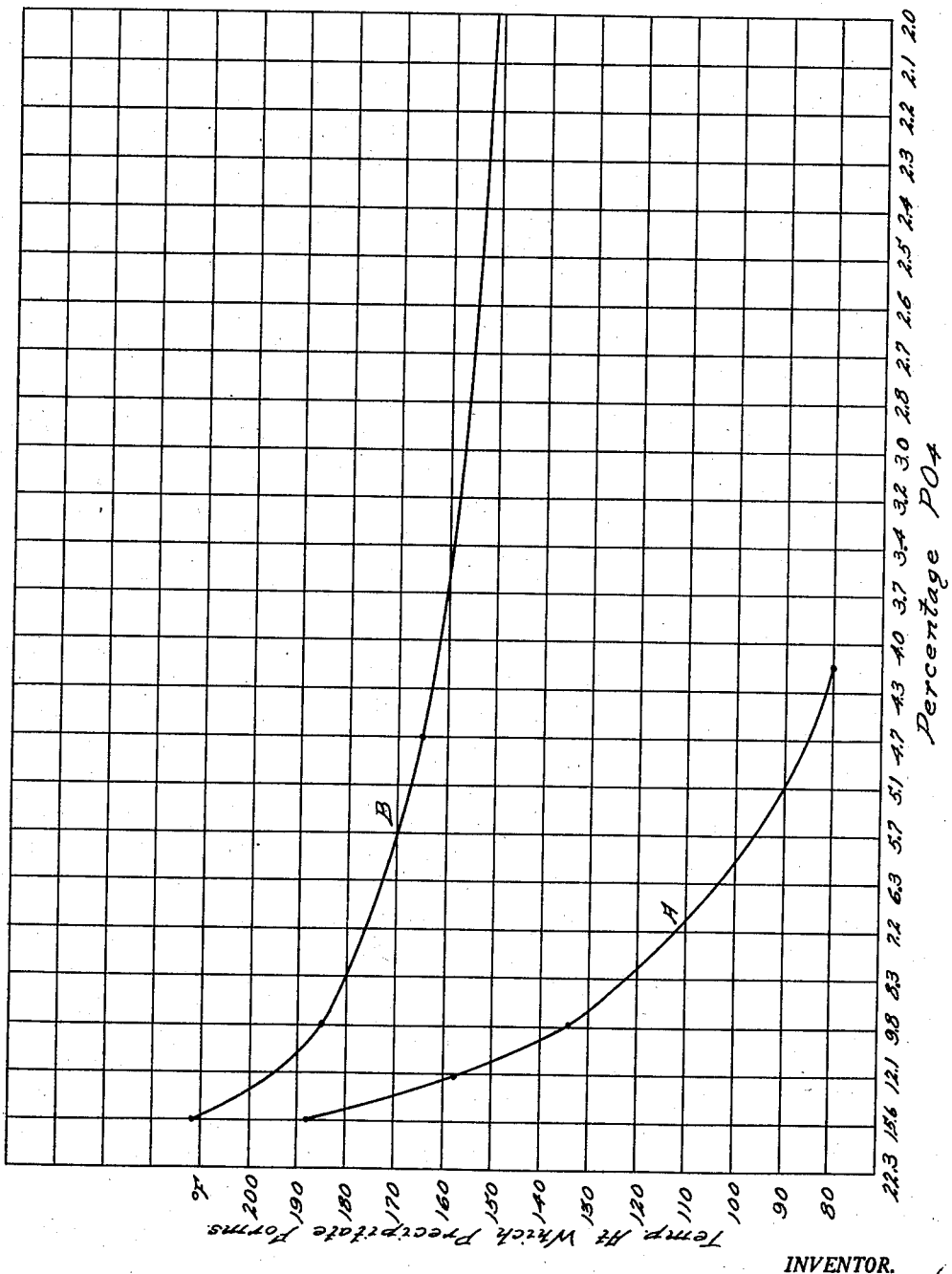

2,564,864

UNITED STATES PATENT OFFICE 2,564,864

METHOD OF AND SOLUTION FOR INCREASING RESISTANCE TO CORROSION

John S. Thompson, Detroit, Mich., assignor to Parker Rust Proof Company, Detroit, Mich.

Application July 2, 1948, Serial No. 36,595

15 Claims. (Cl. 148—6.16)

This invention relates to increasing the corrosion resistance of metals. More particularly it relates to a solution and the use thereof in treating metal surfaces, either bare or coated with chemically produced coatings, to increase the corrosion resistance thereof.

The object of the invention is to afford a method and a material by which the corrosion resistance of metals will be increased. More particularly the object is to provide a solution whose chief ingredients are phosphoric acid, chromic acid and aluminum in such proportions that when applied to surfaces of iron, zinc, aluminum or alloys in which they are the chief ingredient, whether bare or provided with previously formed chemical coatings, the corrosion resistance is appreciably increased.

An acid solution of aluminum phosphate applied to and dried on the surface of iron, zinc or aluminum increases the corrosion resistance and improves the surface as a paint base whether the solution is applied to the bare metal or to a previously formed chemical coat such as phosphate, oxalate, fluoride or the like. While the exact chemical action by which the improvement is obtained is not certain, it is believed that it involves the formation of water-insoluble phosphate which remains on the treated surface. At any rate, it seems to be advantageous to employ a solution which is high in aluminum.

The amount of aluminum required to saturate the solution is not enough to replace all of the hydrogen in the phosphoric acid employed, but varies with the temperature and with the amount of $PO_4$ in the solution. The higher the temperature the less aluminum will remain in solution and the more dilute the solution the less aluminum in proportion to the $PO_4$ will remain in solution. This relation is illustrated in the accompany drawing forming a part of this specification.

The drawing indicates the effects of temperature and dilution upon the solubility of aluminum phosphate in water. Line A shows the temperature at which a precipitate begins to form with successive dilutions of an aqueous solution containing one part by weight of aluminum to eight parts of $PO_4$. Starting with a solution containing 38% $PO_4$ and having a specific gravity of 1.40, successive equal parts by measure of water were added and then the solutions were heated to ascertain at what temperature a precipitate would begin to form. Before dilution and after adding an equal measure of water, no precipitate formed at boiling temperature. Another equal increment of water, making a solution containing about 15.6% $PO_4$, began to show signs of precipitation at a temperature of about 188° F. Similarly, after additional increments of water, producing solutions containing 12.1% and 9.8% $PO_4$ respectively, the indicated temperatures are 158° and 134° F. respectively. As indicated by line A, between eleven and twelve increments, making a solution containing about 4% $PO_4$, is about as dilute a solution as will remain clear up to 80° F. where the ratio remains 1 to aluminum to 8 of $PO_4$.

Line B shows what happens when there is only about 1 part by weight of aluminum to 12 of $PO_4$. In this case also the added increments reduce the temperature permissible if the solution is to remain clear, but with the smaller proportion of aluminum a much greater dilution is permissible at any given temperature, and any dilution likely to be of interest remains clear at higher than usual atmospheric temperatures.

Too concentrated solutions cling to the surface in undesirably large amounts when applied by spraying or dipping. A solution approximately saturated with aluminum and containing over 10% by weight of $PO_4$ is objectionably viscous and adhesive unless applied by rollers to flat sheets or in some other way by which the thickness applied may be limited.

As shown by line A, about the limit of dilution of $PO_4$ that will retain in solution at 80° F. one part of aluminum to eight parts $PO_4$ is 4% $PO_4$. However, for many purposes a much more dilute solution is sufficient to obtain the desired benefit. By the addition of chromic acid, the aluminum may be retained in more dilute solutions. As the solution becomes more dilute, more chromic acid in proportion to the $PO_4$ is required to keep in solution the same proportion of aluminum to $PO_4$. For example when the proportion of $PO_4$ to aluminum is 8 to 1 in a solution containing 10 grams of $PO_4$ per liter, precipitation is prevented at 80° F. by about ½ gram of chromic acid per liter, at 130° F. it requires about 2 grams per liter of chromic acid, and at 200° F., 5 grams. When the solution contains 3 grams of $PO_4$ per liter, precipitation is prevented at 80° F. by .4 gram per liter of chromic acid, at 130° F. by 1.2 grams per liter and at 200° F. by 2.3 grams. When there is 12 times as much $PO_4$ by weight as there is aluminum in the solution, in a solution containing 10 grams of $PO_4$ per liter, precipitation does not occur at room temperature without any chromic acid while at 130° F. it is prevented by .6 gram per liter of chromic acid and at 200° F. by 2.5 grams, while in the same solution diluted to contain about 3 grams per liter of PO₄, precipitation is prevented at 130° F. by about .4 gram chromic acid per liter, and at 200° F. by 1.3 grams. It will be seen that the amount of chromic acid required to prevent precipitation varies with the proportion of aluminum to PO₄ and with the temperature employed.

As a practical matter it is preferable to first dissolve aluminum powder to approximate saturation in a fairly concentrated solution of phosphoric acid. In a solution containing over 50% by weight of PO₄ difficulty is encountered in quickly removing air bubbles. As the limit of dilution is approached for retaining the desired proportion of aluminum, the time required for dissolving the aluminum lengthens. Also, for handling, storing and shipping a concentrated solution is preferable. Therefore, a solution containing about 38% PO₄ is recommended for dissolving about 5% of aluminum. If chromic acid is added before the aluminum is all dissolved, it inhibits the action, but after the aluminum is once dissolved, the chromic acid aids in retaining it in solution. The solution may be made starting with other compounds, such as alumina, aluminum hydroxide or aluminum dichromate, just so the desired final composition is produced. A sufficient amount of chromic acid may be added to take care of any intended dilution at the temperature at which it is to be used. Under some circumstances considerably more by weight of chromic acid than there is of PO₄ may be added without detriment and an excess of chromic acid is recommended over that necessary to keep the solution clear under any conditions of dilution and temperature to which it will be subjected in use. Too much chromic acid is likely to cause undesirable staining of the work. With chromic acid present, less aluminum than required for saturation gives very good results.

By way of illustration the following examples of uses of the solution will be given.

The resistance to corrosion of many ferrous articles is increased by heavy phosphate coatings which may be oiled or waxed or left untreated according to the requirements of the particular articles being treated. After the articles are removed from the phosphate coating solution they are washed customarily. It has been found that the resistance to corrosion may be markedly improved by treatment in an aluminum phosphate solution. One solution in regular commercial use has the following composition by chemical analysis.

|  | Per cent |
|---|---|
| CrO₃ | 0.25 to 0.28 |
| Al | 0.03 to 0.035 |
| PO₄ | 0.24 to 0.29 |

Ferrous articles coated as described with a heavy phosphate coating, rinsed, and then dipped in a solution corresponding with the foregoing analysis for a time ranging from 5 to 30 seconds at a temperature of 160° F. to 200° F. and then removed, dry quickly and show markedly more corrosion resistance, whether tested bare or oiled before testing, than similarly treated articles, omitting the aluminum phosphate. Treatment with a solution containing the chromic acid without the aluminum phosphate is some improvement over no treatment, but is inferior to the above-described solution, and is more apt to cause undesirable staining. The inclusion of chromic acid increases the results of the aluminum phosphate treatment, especially where the solution is quite dilute. Good results may be obtained by use of a chromic acid solution prior to, but not after, the aluminum phosphate treatment.

Benefit may be obtained from solutions in which the PO₄ varies from 7 to 12 times the weight of aluminum, and with the percentage of PO₄ to water varying midely, but a much more dilute solution than that given does not impart as much corrosion resistance while a solution richer in PO₄ does not give noticeably better results although using more chemicals. Therefore the dilution given is about the highest in efficiency from the standpoint of dilution for this particular purpose.

More than eight times as much PO₄ as aluminum increases the danger of chromic acid stains, but up to 12 times as much PO₄ as aluminum does not greatly vary the resultant corrosion resistance where chromic acid is included. Increase of temperature of treatment over atmospheric seems to give slightly better results, but is desirable chiefly because it hastens drying after treatment.

The treatment described adds to the corrosion resistance whether the treated phosphate coating predominates in phosphate of manganese, iron or zinc. Also, in any such case, the phosphate coating time may be greatly reduced and the resultant coating rendered more corrosion resistant by the aluminum phosphate treatment than the full time phosphate coating could be without that treatment.

When treating bare metal, whether ferrous, zinc or aluminum, a somewhat more dilute solution is about as effective as the one given above, and this is true also when the solution is employed over thin phosphate coatings such as are used customarily as a base for paint. Such a solution as given above diluted to contain .20 to .25% PO₄ has been used with success in treating bare iron, steel, zinc, aluminum and alloys composed chiefly of zinc or aluminum, as well as over thin phosphate coatings suitable as a base for paint and produced by phosphate solutions accelerated by different chemicals. The increase in bare resistance to corrosion of the treated articles, as tested by salt spray, is marked. The treated articles also have increased corrosion resistance after painting, but for many purposes a properly produced phosphate coating constitutes such a good base for paint that further improvement is of little practical advantage. Where improvement is needed, the described treatment will produce it.

In treating phosphate coatings intended as paint bases, the solution may be applied in various ways at various temperatures, but spraying onto the coated and washed work at a temperature of about 130° F. has fitted into the plant procedure most widely used.

When treating other chemical coatings on metal, the strength of the solution and the time and temperature of its use may be varied widely, and the best conditions will depend upon the details of each case. Apparently some reaction to render the aluminum phosphate insoluble is needed for best results, but there should not be excessive attack on the previously formed coating. For example, a solution containing about eight times as much PO₄ by weight as aluminum, and with about 4.75% PO₄ and 2% chromic acid applied to an oxalate coating on iron at room temperature and air dried gave good results with no noticeable change in the appearance of the oxalate coating, but when applied at 190° F. the oxalate coating was severely attacked with injurious results. This illustrates the fact that the strength and temperature of the solution should be adjusted to the surface being treated.

To color the treated surface, a water soluble dye, such as Ink Blue Dye #BJTBMA, an acid type dye, color index number 706, a triphenylmethanetriamino derivative, may be added to the solution, and when the aluminum phosphate reacts to form insoluble phosphate, there is also a reaction which sets the dye, rendering it water insoluble. As a specific example, about 1% of the dye specified above was added to a solution containing about 6.4% $PO_4$, by weight, and .8% aluminum, with a little wetting agent, and the solution applied to ferrous articles coated with a heavy phosphate coating. The result was a water-resistant dyeing of the treated surface and a corrosion resistance even greater than where an otherwise identical treatment omitted the dye. The 1% of dye was greatly in excess of that required. As little as .0005% of the dye imparts a definite color. Solutions with varying amounts of dye will definitely color treated surfaces having thinner phosphate coatings and also bare metal surfaces with which the aluminum phosphate reacts, the setting of the dye apparently accompanying such reaction. The particular dye specified may be used at atmospheric temperatures with solutions containing chromic acid, but at elevated temperatures the chromic acid causes it to lose color. Other dyes having similar characteristics may be used.

The desirable solutions discussed above have a pH of 1.9 to 4. Another metal may be substituted for a minor proportion of the aluminum and still give beneficial results if the pH is kept within the range of 1.9 to 4 and preferably 2 to 4.

For general use, an aqueous solution may be made up with its essential ingredients consisting of aluminum, $PO_4$ and $CrO_3$ in proportions of 7 to 12 times as much $PO_4$ by weight as aluminum and with two-thirds to one and a third as much $CrO_3$ as there is $PO_4$, by analysis and calculation, and such a solution may be shipped and stored in relatively concentrated form and then diluted as much as desired and used with little danger of precipitation from dilution or heating and with little danger of objectionable stains on the work. As will be seen from the detailed description, wider variations are within the scope of the invention and the broader claims which define the invention.

What I claim is:

1. The method of increasing the corrosion resistance of metal of the class consisting of iron, zinc and aluminum and alloys of which they constitute the chief ingredients, which comprises treating the surface thereof with an aqueous solution in which the essential solute consists of aluminum phosphate in which there is from seven to twelve times as much $PO_4$ by weight as there is of aluminum and the pH of which is from 1.9 to 4.

2. The method of increasing the corrosion resistance of metal of the class consisting of iron, zinc and aluminum and alloys of which they constitute the chief ingredients which comprises treating the surface thereof with an aqueous solution in which the essential ingredients of the solute are aluminum, $PO_4$ and $CrO_3$, the $PO_4$ being from seven to twelve times as much by weight as the aluminum and the $CrO_3$ being in sufficient amount to prevent precipitation upon standing.

3. The method of increasing the corrosion resistance of metal of the class consisting of iron, zinc and aluminum and alloys of which they constitute the chief ingredients which comprises treating the surface thereof with an aqueous solution in which the essential ingredients of the solute are aluminum, $PO_4$ and $CrO_3$, the $PO_4$ being from seven to twelve times as much by weight as the aluminum and the $CrO_3$ being from two-thirds to one and one-third as much as the $PO_4$.

4. The method of increasing the corrosion resistance of metal of the class consisting of iron, zinc and aluminum and alloys of which they constitute the chief ingredients, the surface having a chemically formed coating thereon, which comprises treating the surface thereof with an aqueous solution in which the solute consists essentially of aluminum phosphate in which there is from seven to twelve times as much $PO_4$ by weight as there is of aluminum and the pH of which is from 1.9 to 4.

5. The method of increasing the corrosion resistance of metal of the class consisting of iron, zinc and aluminum and alloys of which they constitute the chief ingredients, the surface having a chemically formed coating thereon, which comprises treating the surface thereof with an aqueous solution in which the essential ingredients of the solute are aluminum, $PO_4$ and $CrO_3$, the $PO_4$ being from seven to twelve times as much by weight as the aluminum and the $CrO_3$ being in sufficient amount to prevent precipitation upon standing.

6. The method of increasing the corrosion resistance of metal of the class consisting of iron, zinc and aluminum and alloys of which they constitute the chief ingredients, the surface having a chemically formed coating thereon, which comprises treating the surface thereof with an aqueous solution in which the essential ingredients of the solute are aluminum, $PO_4$ and $CrO_3$, the $PO_4$ being from seven to twelve times as much by weight as the aluminum and the $CrO_3$ being from two-thirds to one and one-third as much as the $PO_4$.

7. The method of increasing the corrosion resistance of a ferrous surface having a phosphate coating thereon which comprises treating the coated surface with an aqueous solution in which the essential ingredients of the solute is acid aluminum phosphate in which there is from seven to twelve times as much $PO_4$ by weight as there is of aluminum and the pH of which is from 1.9 to 4.

8. The method of increasing the corrosion resistance of a ferrous surface having a phosphate coating thereon which comprises treating the coated surface with an aqueous solution in which the essential ingredients of the solute are aluminum, $PO_4$ and $CrO_3$, the $PO_4$ being from seven to twelve times as much by weight as the aluminum and the $CrO_3$ being in sufficient amount to prevent precipitation upon standing.

9. The method of increasing the corrosion resistance of a ferrous surface having a phosphate coating thereon which comprises treating the coated surface with an aqueous solution in which the essential ingredients of the solute are aluminum, $PO_4$ and $CrO_3$, the $PO_4$ being from seven to twelve times as much by weight as the aluminum and the $CrO_3$ being from two-thirds to one and one-third as much as the $PO_4$.

10. A solution for increasing corrosion resistance of a metal of the class consisting of iron, zinc, aluminum, and alloys of which they constitute the chief ingredients consisting essentially of an aqueous solution in which the essential ingredient of the solute is acid aluminum phosphate in which the PO₄ is from 7 to 12 times as much by weight as the aluminum and hexavalent chromium, the solution being sufficiently acid to prevent precipitation.

11. A solution for increasing corrosion resistance of a metal of the class consisting of iron, zinc, aluminum, and alloys of which they constitute the chief ingredients consisting essentially of an aqueous solution in which the essential ingredient of the solute is acid aluminum phosphate in which the PO₄ is from 7 to 12 times as much by weight as the aluminum and hexavalent chromium, equaling in weight, when calculated as CrO₃, from two-thirds to one and one-third the PO₄ present in the solution.

12. The method of simultaneously dyeing and increasing the corrosion resistance of a metal surface of the class consisting of iron, zinc, aluminum, and alloys of which they constitute the chief ingredients, the surface having a chemically formed phosphate coating thereon, said method comprising treating said surface with an aqueous solution having a pH from 1.9 to 4 and in which essential ingredients of the solution are an acid type dye and aluminum phosphate in which there is from 7 to 12 times as much PO₄ as there is aluminum.

13. The method of increasing the corrosion resistance of metal of the class consisting of iron, zinc and aluminum and alloys of which they constitute the chief ingredients which comprises treating the surface thereof with an aqueous solution in which the essential ingredients of the solute are CrO₃ and acid aluminum phosphate in which there is from 7 to 12 times as much PO₄ by weight as there is aluminum and the pH is from 1.9 to 4.

14. A solution for increasing corrosion resistance of a metal of the class consisting of iron, zinc, aluminum and alloys of which they constitute the chief ingredients consisting essentially of an aqueous solution in which the essential ingredients of the solute are hexavalent chromium and acid aluminum phosphate in which the PO₄ is from 7 to 12 times as much by weight as the aluminum and an acid type water soluble dye, the solution being sufficiently acid to prevent precipitation.

15. A solution for increasing corrosion resistance of a metal of the class consisting of iron, zinc, and aluminum and alloys of which they constitute the chief ingredients consisting essentially of an aqueous solution in which the essential ingredients of the solute are acid aluminum phosphate in which the PO₄ is from 7 to 12 times as much by weight as the aluminum and an acid type water soluble dye and the pH of which is from 1.9 to 4.

JOHN S. THOMPSON.

REFERENCES CITED

The following references are of record in the file of this patent:

UNITED STATES PATENTS

| Number | Name | Date |
|---|---|---|
| 1,826,866 | Cole | Oct. 13, 1931 |
| 2,001,427 | Leahy | May 14, 1935 |
| 2,030,601 | McDonald | Feb. 11, 1936 |
| 2,067,215 | Tanner et al. | Jan. 12, 1937 |
| 2,137,370 | Unger | Nov. 22, 1938 |
| 2,164,042 | Romig | June 27, 1939 |
| 2,312,855 | Thompson | Mar. 2, 1943 |
| 2,418,608 | Thompson et al. | Apr. 8, 1947 |
| 2,438,877 | Spruance, Jr. | Mar. 30, 1948 |